United States Patent [19]
Bonitz et al.

[11] Patent Number: 5,090,204
[45] Date of Patent: Feb. 25, 1992

[54] PROCESS AND DEVICE FOR BOOST CONTROL

[75] Inventors: Jörg Bonitz, Mühlacker; Siegfried Rohde, Oberriexingen; Bernhard Miller, Stuttgart; Walter Künzel, Ludwigsburg, all of Fed. Rep. of Germany

[73] Assignee: Robert Bosch GmbH, Stuttgart, Fed. Rep. of Germany

[21] Appl. No.: 477,974

[22] PCT Filed: Aug. 24, 1989

[86] PCT No.: PCT/DE89/00555
§ 371 Date: Apr. 30, 1990
§ 102(e) Date: Apr. 30, 1990

[87] PCT Pub. No.: WO90/03503
PCT Pub. Date: Apr. 5, 1990

[30] Foreign Application Priority Data

Sep. 29, 1988 [DE] Fed. Rep. of Germany ....... 3832965

[51] Int. Cl.$^5$ .............................................. F02B 33/44
[52] U.S. Cl. ...................................... 60/612; 123/562
[58] Field of Search ........................... 60/612; 123/562

[56] References Cited
U.S. PATENT DOCUMENTS 2,199,259  4/1940  Hersey .................................. 60/612

Primary Examiner—Richard A. Bertsch
Assistant Examiner—Charles G. Freay
Attorney, Agent, or Firm—Walter Ottesen

[57] ABSTRACT

An arrangement for boost control either has a pressure sensor and a differential-pressure sensor, the pressure sensor being connected to one of two suction paths of an internal combustion engine and the differential-pressure sensor being located between the two suction paths, or the device possesses a single pressure sensor 18 which is switched alternately to the first suction path 11.1 and to the second suction path 11.2 by means of a change-over valve 24.

These arrangements and the associated methods make it possible to control to the same predetermined pressure in the two suction paths with a high degree of accuracy. This is because there is no possibility of a systematic error which, in previous arrangements and methods, arose from the fact that the pressures in the two suction paths were measured by separate pressure sensors. However, different pressure sensors in a simple version indicate different values at the same pressures.

4 Claims, 2 Drawing Sheets

PROCESS AND DEVICE FOR BOOST CONTROL

FIELD OF THE INVENTION

The invention relates to a method and an arrangement for controlling the boost pressure on an internal combustion engine with a first and a second suction path, each having suction pressures which are controlled.

BACKGROUND OF THE INVENTION

There is a known arrangement for boost control, having two pressure sensors which each measure the suction-path pressure in one of the two suction paths. These measured suction-path pressures are each compared with a desired value, and one of two means of controlling determines a duty factor for a bypass valve on each of the two supercharging turbines from the respective control deviation values.

With the known arrangement, therefore, there are different suction-path pressures when the two pressure sensors do not work in an identical way, which happens frequently.

SUMMARY OF THE INVENTION

The object on which the invention is based is to provide a method for boost control, by means of which the boost pressures in two suction paths can each be regulated to the same value with a high degree of accuracy. A further object on which the invention is based is to provide an arrangement for carrying out such a method.

The invention relates to a method for boost control in an internal combustion engine having a first and a second suction path with the suction pressures of each path being controlled. According to a first embodiment of the method, the boost pressure in the first suction path is measured and this boost pressure is regulated to a desired value. The differential pressure between the boost pressures in the first and second suction paths is measured and the boost pressure in the second suction path is regulated to the desired value by taking into account the boost pressure in the first suction path and the differential pressure.

In a second embodiment of the method of the invention, the boost pressures in the first and second suction paths are measured alternately by switching over the pressures to a single pressure sensor. The control value determined for one suction path is maintained, while the boost pressure for the other suction path is measured and controlled.

In the arrangement according to the invention, a pressure sensor is connected only to one suction path. Additionally, however, there is a differential-pressure sensor between the two suction paths. It is possible by means of this arrangement to carry out a method according to which the suction pressure in that suction path, to which the pressure sensor is connected, is controlled directly by means of the measured pressure signal, while the pressure in the other suction path is controlled by means of the pressure signal from the other suction path and the differential pressure. This arrangement and the associated method do not place high demands on the accuracy of the pressure sensor and of the differential-pressure sensor. It is merely necessary to ensure that, when the differential pressure is 0, the differential-pressure sensor indicates this differential pressure 0 correctly.

In another embodiment of the arrangement according to the invention, there is only a single pressure sensor which can be connected alternately to the two suction paths. Thus, since the same pressure sensor is used for pressure measurement in both suction paths, identical suction-path pressures can be set easily, irrespective of the accuracy of the pressure sensor. The method with the arrangement just mentioned works in such a way that, during the time when the pressure signal for one suction path is being measured, the pressure signal for the other suction path is maintained, so that it is available for the control.

BRIEF DESCRIPTION OF THE DRAWINGS

The invention is explained in detail below by means of the embodiments illustrated by figures. Of these.

DESCRIPTION OF THE PREFERRED EMBODIMENTS OF THE INVENTION

Figure 1:
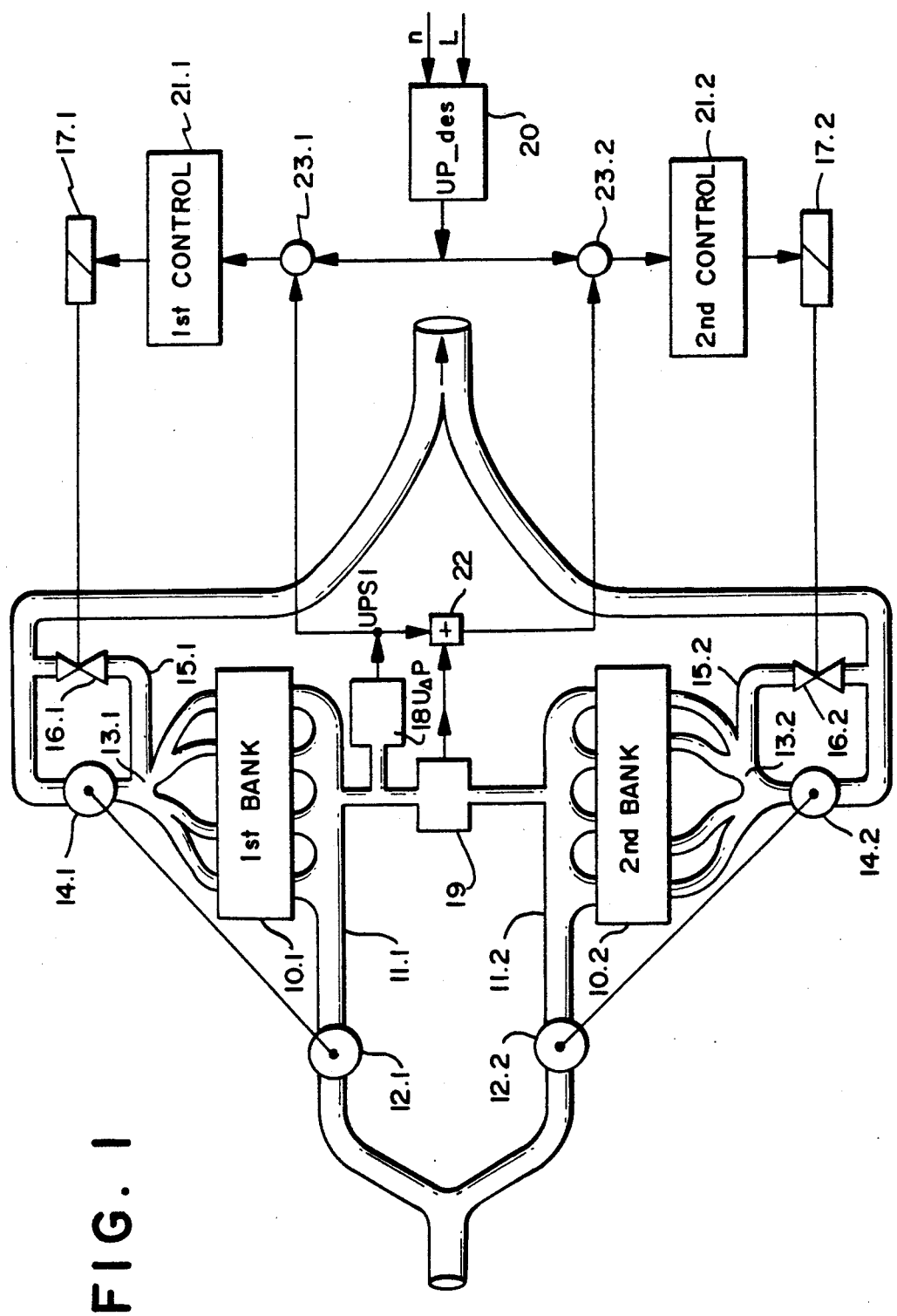
FIG. 1 shows an arrangement for boost control with a pressure sensor and a differential-pressure sensor.

The boost-control arrangement according to FIG. 1 is used there on a V-engine with 8 cylinders which has two banks 10.1 and 10.2 of 4 cylinders each. A first supercharger 12.1 is arranged in the suction tract 11.1 of the first bank 10.1, while in the associated exhaust-gas tract 13.1 there is a first turbine 14.1 which is driven by the exhaust gas and which thereby drives the supercharger 12.1. The driving connection between the supercharger 12.1 and the turbine 14.1 is represented by a solid line. A first timing valve 16.1 drivable by means of the first timing control 17.1 is arranged in a bypass line 15.1 to the first turbine 14.1. The bypass throughflow rate and consequently the rotational speed of the turbine 14.1 and thereby, in turn, the boost pressure provided by the first supercharger 12.1 can be set by activating the timing valve 16.1.

Components corresponding to those on the first bank 10.1 are present on the second bank 10.2. Corresponding reference symbols bear the additional designation "0.2" instead of "0.1".

The arrangement for boost control has a pressure sensor 18, a differential-pressure sensor 19, a desired-value transmitter 20, a first means of control 21.1 and a second means of control 21.2. Moreover, an addition unit 22 as well as a first subtraction unit 23.1 and a second subtraction unit 23.2 are provided. The pressure sensor 18 is connected to the first suction tract 11.1, and the differential-pressure sensor 19 connects the first suction path 11.1 to the second suction path 11.2.

This arrangement functions as follows.

The signal emitted by the pressure sensor 18, namely a voltage signal UPS1, is supplied to the first subtraction unit 23.1. There, this signal is subtracted from a desired voltage UP_des. The control deviation UP1 is supplied to the first means of control 21.1 which emits in the usual way a timing signal to the first timing control 17.1 as a function of the control deviation.

To that extent, the functioning of the arrangement illustrated in no way differs from the arrangement known from the state of the art.

In the arrangement according to the state of the art, the boost control for the second bank works in a completely identical way to the boost control for the first bank, that is, there is also a second pressure sensor connected to the second suction path. However, this is not true for the arrangement illustrated. In particular, a voltage measured by a second pressure sensor is not supplied to the second subtraction unit 23.2, but instead the subtraction unit 23.2 receives a signal which corresponds to the sum of the pressure signal UPS1 from the pressure sensor 18 and of the differential-pressure signal UΔP from the differential-pressure sensor 19. The sum of these two signals is formed in the addition unit 22. The differential-pressure sensor 19 is connected in such a way that, when the pressure in the second suction path 11.2 is higher than in the first suction path 11.1, it emits a signal with a sign corresponding to the sign of the signal UPS1 from the pressure sensor 18. Otherwise, the control of the boost pressure for the second bank 10.2 takes place exactly according to the above-described control for the first bank 10.1. The difference, therefore, is only that the actual values for the control are formed differently.

For the calibration of the arrangement, it is merely necessary to ensure that the differential-pressure sensor 19 emits a signal of the value 0 at the pressure difference 0. Moreover, the demands of accuracy placed on the pressure sensor 18 and the differential-pressure sensor 19 are not high, since it is only important to set the same pressure in each of the two suction paths 11.1 and 11.2, this being guaranteed when the differential-pressure sensor 19 then transmits the value 0.

Figure 2:
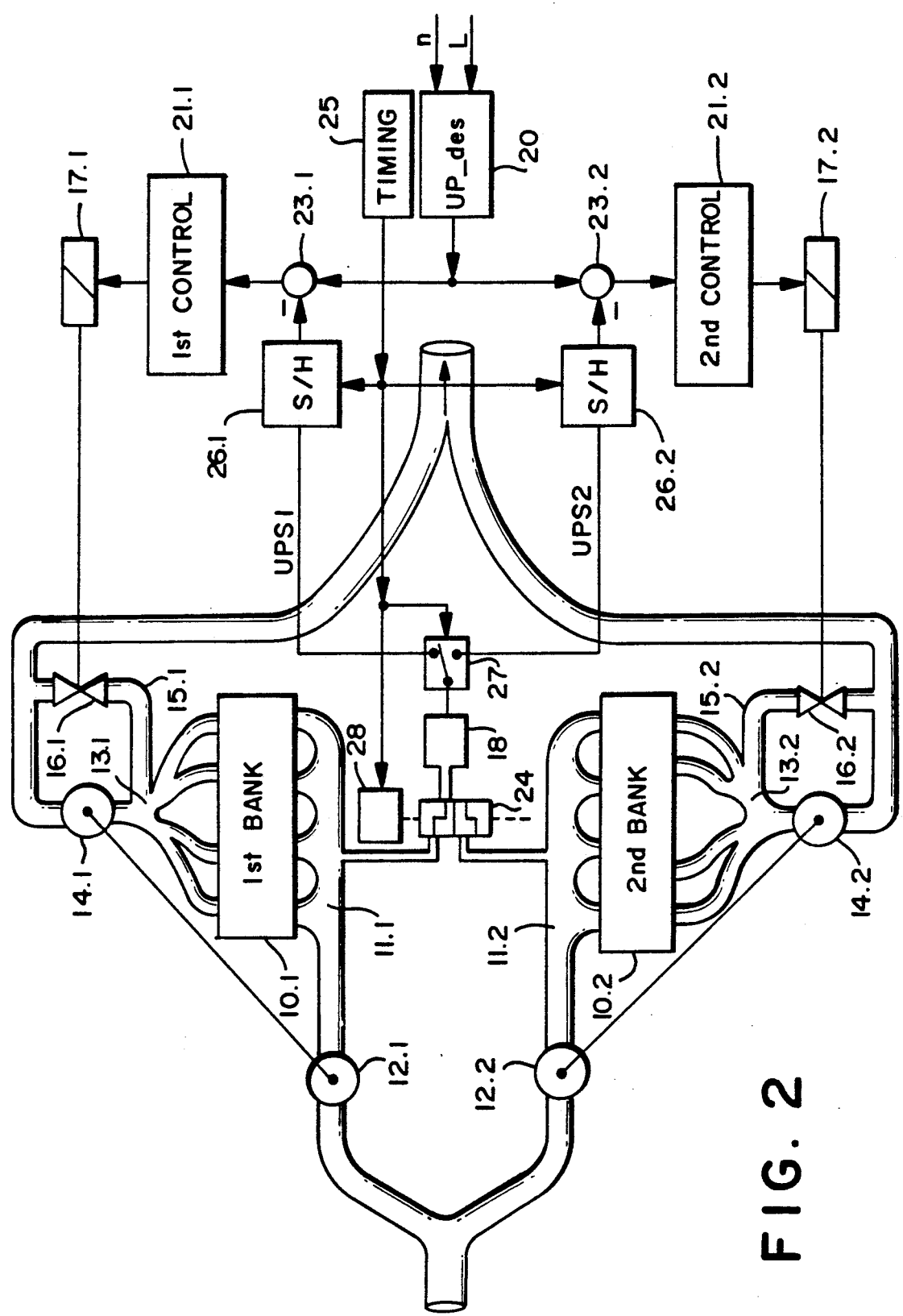
FIG. 2 shows an arrangement for boost control with a single pressure sensor which can be fitted alternately to two suction paths.

An arrangement is explained with reference to FIG. 2 which can be produced even more cost-effectively than the arrangement according to FIG. 1, specifically because only a single pressure sensor 18 is used instead of a pressure sensor 18 and a differential-pressure sensor 19. In the arrangement according to FIG. 2, not only the differential-pressure sensor 19, but also the addition unit 22 is omitted. Instead, there are as additional functional parts a change-over valve 24 and a clock generator 25 which activates a first sensing/holding circuit 26.1, a second sensing/holding circuit 26.2, a signal switch 27 and a valve change-over switch 28. All the other functional parts correspond exactly to those of the arrangement according to FIG. 1.

The change-over valve 24 has two switch positions. In the first switch position shown, it connects the first suction path 11.1 to the pressure sensor 18. Correspondingly, in its second position, it connects the second suction path 11.2 to the pressure sensor 18. The valve can be changed over pneumatically between the two positions, this taking place by means of the valve switch 28 according to the timing predetermined by the timing generator 25. In the example, the timing frequency is 10 Hz. Whenever the pressure sensor 18 has just been connected to the first suction path 11.1, the signal switch 27 switches the output signal USP1 from the pressure sensor 18 to the first sensing/holding circuit 26.1 in response to the timing signal from the timing generator 25. From the first sensing/holding circuit 26.1, output signal USP1 arrives at the first subtraction unit 23.1. There, a difference is formed again to obtain a desired value UP_ des which is emitted by the desired-value transmitter 20 as a function of the values of the engine speed n and a load-dependent parameter L, for example the throttle-flap angle. The further control cycle takes place in the way described above with reference to FIG. 1.

In contrast, if the pressure sensor 18 was connected to the second suction path 11.2 by means of the timing signal from the timing generator 25, the signal switch 27 correspondingly switches the output signal USP2 from the pressure sensor 18 to the second sensing/holding circuit 26.2 and from there to the second subtraction unit 23.2. What was said above applies accordingly to the further control.

In practice, as many of the functional groups described as possible are implemented by the functioning of a microcomputer. These are particularly the desired-value transmitter 20 which is then designed, for example, as a memory, the two means of control 21.1 and 21.2, the subtraction units 23.1 and 23.2, the addition unit 22 and the sensing/holding circuits 26.1 and 26.2. The sensing/holding functions do not necessarily have to be at the illustrated point along the signal path. They can also perform their function, for example, at the outputs of the means of control. A microcomputer senses, for example, the pressure sensor 18 at predetermined time intervals whenever the latter has just been switched to one of the two suction paths. The measured value is used to calculate a new actuating value for the associated control circuit. The actuating value in the other control circuit is maintained and emitted to the associated timing control until a new actuating value is calculated for this control circuit too.

The above-described functional cycles correspond to preferred embodiments. However, the functional cycles described in detail are not essential to the invention, but it is crucial that the pressure control in the two suction paths should not be carried out by means of two separate pressure sensors, but either by means of a pressure sensor and a differential-pressure sensor or by means of a single pressure sensor which is switched alternately to the two suction paths.

What is claimed is:

1. A method for boost control in an internal combustion engine having a first suction path communicating with a first supercharger and a second suction path communicating with a second supercharger wherein the respective suction pressures are controlled, the method comprising the steps of:
   measuring the boost pressure in the first suction path and regulating this boost pressure to a desired value; and,
   measuring the differential pressure between the boost pressures in the first and second suction paths and regulating the boost pressure in the second suction path to the desired value by utilizing both said boost pressure in the first suction path and said differential pressure.

2. A method for boost control in an internal combustion engine having a first suction path communicating with a first supercharger and a second suction path communicating with a second supercharger, the method comprising the steps of:
   measuring the boost pressures in the suction paths and controlling the measured boost pressures to a same desired value;
   alternately measuring the boost pressures in the first and second suction paths by switching over the pressures in said suction paths to a single pressure sensor; and,
   maintaining the control value determined for one of the suction paths while measuring and controlling the boost pressure for the other one of the suction paths.

3. An arrangement for providing boost control in an internal combustion engine having a first suction path communicating with a first supercharger and a second suction path communicating with a second supercharger wherein respective boost pressures are present during operation of the engine, the arrangement comprising:
- a pressure sensor connected to one of said suction paths for providing a first signal indicative of the pressure in said one suction path;
- a differential pressure sensor connected between said suction paths for providing a second signal indicative of the difference pressure between said paths;
- first control means for controlling the boost pressure in said first suction path to a desired value;
- second control means for controlling the boost pressure in said second suction path to said desired value;
- said first control means being connected to said pressure sensor and including means for processing said first signal as an actual value; and,
- said second control means being connected to each of said sensors and including means for processing said first and second signals as actual values.

4. An arrangement for providing boost control in an internal combustion engine having a first suction path communicating with a first supercharger and a second suction path communicating with a second supercharger wherein respective boost pressures are present during operation of the engine, the arrangement comprising:
- a pressure measuring apparatus for measuring the boost pressure in each of the suction paths, the pressure measuring apparatus including a single pressure sensor for providing a signal indicative of the pressure measured; and, switchover means for alternately connecting said pressure sensor to said suction paths for alternately providing first and second signals indicative of the respective pressures measured in corresponding ones of said suction paths;
- first control means for controlling the boost pressure in said first suction path to a desired value;
- second control means for controlling the boost pressure in said second suction path to said desired value; and,
- each of said control means including: means for holding a control variable for the suction path corresponding thereto while said pressure sensor measures the pressure in the suction path corresponding to the control means.

* * * * *